US011372653B1

(12) United States Patent
Santharam et al.

(10) Patent No.: US 11,372,653 B1
(45) Date of Patent: Jun. 28, 2022

(54) RUNTIME ACCESS TO FIRMWARE PLATFORM CONFIGURATION DATA

(71) Applicant: AMERICAN MEGATRENDS INTERNATIONAL, LLC, Norcross, GA (US)

(72) Inventors: Madhan B. Santharam, Duluth, GA (US); Stefano Righi, Lawrenceville, GA (US)

(73) Assignee: AMERICAN MEGATRENDS INTERNATIONAL, LLC, Norcross, GA (US)

(*) Notice: Subject to any disclaimer, the term of this patent is extended or adjusted under 35 U.S.C. 154(b) by 341 days.

(21) Appl. No.: 16/778,385

(22) Filed: Jan. 31, 2020

(51) Int. Cl.
*G06F 9/44* (2018.01)
*G06F 9/4401* (2018.01)
*G06F 9/445* (2018.01)
*G06F 9/54* (2006.01)

(52) U.S. Cl.
CPC ........ *G06F 9/4411* (2013.01); *G06F 9/44505* (2013.01); *G06F 9/44578* (2013.01); *G06F 9/547* (2013.01)

(58) Field of Classification Search
CPC ..... G06F 1/32; G06F 1/12; G06F 9/44; G06F 21/575
See application file for complete search history.

(56) References Cited

U.S. PATENT DOCUMENTS

| 9,727,390 | B1* | 8/2017 | Righi | ............ G06F 3/123 |
| 9,734,311 | B1* | 8/2017 | Righi | ............ G06F 21/32 |
| 2005/0091416 | A1* | 4/2005 | Qureshi | ............ G06F 9/52 710/1 |
| 2021/0081117 | A1* | 3/2021 | Liu | ............ G06F 21/78 |

* cited by examiner

*Primary Examiner* — Keshab R Pandey
(74) *Attorney, Agent, or Firm* — Newport IP, LLC; Leonard J. Hope

(57) ABSTRACT

During boot time of a computing system, a human-readable lookup table is utilized to generate a binary lookup table. At runtime, a hook to a function for reading or setting a firmware variable receives a request in a custom format or a standard format. If the request is in the custom format, the hook locates a mapping identifier (ID) associated with a setup question value to be read or set and a performs a lookup operation in the binary lookup table for the mapping ID. The hook retrieves the offset and bit width associated with the setup question value to be read or set from the binary lookup table. The hook then performs the requested get or set operation using the offset and width for the value and a conventional firmware function for getting or setting a firmware variable.

20 Claims, 8 Drawing Sheets

RUNTIME ACCESS TO FIRMWARE PLATFORM CONFIGURATION DATA

BACKGROUND

Many types of computing systems include a firmware-provided setup utility through which users can define aspects of the configuration of the platform. Through such a utility, users can define values, which might be referred to herein as "setup question values," that are associated with questions, which might be referred to herein as "setup questions," posed by the utility. A user might indicate, for example, that the internet protocol ("IP") address of a computing system is to be "10.10.10.10" or another value. Values for setup questions that are defined through such a utility can be stored in a non-volatile memory device so that the values remain available even after a computing device has been powered off.

During boot time (i.e. the time before a firmware hands off control to an operating system), a firmware-provided setup utility can be used to view and set setup question values. During runtime, however, getting and setting values for firmware setup questions typically requires the use of platform and operating system-specific program code, such as drivers and applications. These platform-specific tools can require significant time and effort to create and, as a result, might not be available for all hardware platforms and operating systems.

It is with respect to these and other considerations that the disclosure made herein is presented.

SUMMARY

Technologies are described herein for providing runtime access to firmware platform configuration data, such as setup question values. Through implementations of the disclosed technologies, setup question values can be accessed and modified at runtime in a platform-independent manner. As a result, custom platform-specific drivers and applications are not required to get and set values for firmware setup questions during the runtime of a computing system. Technical benefits other than those specifically mentioned herein can also be realized through implementations of the disclosed technologies.

In order to provide these technical benefits, and potentially others, a computing device is provided that executes a firmware. At build time of the firmware, a lookup table in a human-readable format (e.g. JAVASCRIPT object notation) is generated. The human-readable lookup table describes aspects of setup questions and associated values utilized by the firmware such as, for example, their name, globally unique identifier ("GUID"), prompt and help strings, and a default setup question value.

The human-readable lookup table also includes data for each setup question value that describes the location of the value within a firmware variable. For instance, the human-readable lookup table might include data defining an offset into a firmware variable for a setup question value and the width (i.e. size) of the value. This information can be used to locate the value for a firmware setup question in the proper firmware variable.

The human-readable lookup table also defines a mapping identifier ("ID") for each setup question value. The mapping ID defines a unique keyword for each value. As will be described in greater detail below, the mapping ID can be utilized to easily get and set setup question values at runtime. In some embodiments, the human-readable lookup table is also made available to application programs at runtime through the Advanced Configuration and Power Interface ("ACPI") or another similar interface.

During boot time of a computing system, the human-readable lookup table is utilized to generate a lookup table in binary format. The binary lookup table includes a portion of the data in the human-readable lookup table for each setup question value, such as the mapping ID, name, and GUID. The binary lookup table also specifies the offset and width of each setup question value in a firmware variable.

During runtime, the firmware can receive and respond to requests to perform firmware functions to get and set setup question values. For example, an application executing on the computing device during runtime might generate such a request through a call to a system management mode ("SMM") handler executing in the firmware. On computing systems executing the WINDOWS operating system, such a request might be generated using a WINDOWS management interface ("WMI") script, for instance.

In order to receive and respond to requests to get and set setup question values, the disclosed firmware includes function hooks ("hooks") that intercept and process function calls directed to conventional firmware-provided functions for getting and setting firmware variables. When a hook for getting or setting a firmware variable receives a request, the hook determines whether the request is in a custom format or a standard format.

In one embodiment, the custom format is a pre-defined format utilized during runtime to identify a setup question value that is to be get or set using the mapping ID for the value. The standard format is the format utilized to call conventional firmware-provided functions for getting and setting firmware variables.

If a hook determines that a request to get or set a firmware variable is in the standard format, the hook calls the conventional get or set function, as appropriate, to perform the requested operation. If, however, a hook determines that a request to get or set a firmware variable is in the custom format, the hook locates the mapping ID associated with the setup question value to be get or set in the request. The hook then performs a lookup operation in the binary lookup table for the mapping ID. If an entry in the binary lookup table is located that includes the mapping ID, the hook retrieves the offset and bit width associated with the setup question value to be get or set. The hook then performs the requested get or set operation by calling the conventional firmware-provided get or set function, as appropriate, with the offset and bit width for the value.

Upon completion, the conventional set or get firmware variable function returns a status (e.g. completion or error) to the hook in the case of a set operation and returns the value for the setup question in the case of a get operation. The hook, in turn, returns the status or value to the calling function and, subsequently, to the application that requested the set or get operation.

It should be appreciated that the above-described subject matter can also be implemented as a computer-controlled apparatus, a computer process, a computing system or device, or as an article of manufacture such as a computer-readable medium. These and various other features will be apparent from a reading of the following Detailed Description and a review of the associated drawings.

This Summary is provided to introduce a selection of the technologies disclosed herein in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

The following detailed description is directed to technologies for providing runtime access to firmware platform configuration data, such as values associated with firmware setup questions. As discussed briefly above, implementations of the disclosed technologies enable setting and getting setup question values during runtime in a platform-independent manner. Technical benefits other than those specifically mentioned herein can also be realized through implementations of the disclosed technologies.

It is to be appreciated that the subject matter presented herein can be implemented as a computer process, a computer-controlled apparatus, a computing system, or an article of manufacture, such as a computer-readable storage medium. While the subject matter described herein is presented in the general context of program modules that execute on one or more computing devices, those skilled in the art will recognize that other implementations can be performed in combination with other types of program modules. Generally, program modules include routines, programs, components, data structures, and other types of structures that perform particular tasks or implement particular abstract data types.

Those skilled in the art will also appreciate that aspects of the subject matter described herein can be practiced on or in conjunction with other computer system configurations beyond those described herein, including multiprocessor systems, microprocessor-based or programmable consumer electronics, minicomputers, mainframe computers, handheld computers, personal digital assistants, e-readers, mobile telephone devices, tablet computing devices, special-purposed hardware devices, network appliances, and the like. The configurations described herein can be practiced in distributed computing environments, where tasks can be performed by remote computing devices that are linked through a communications network. In a distributed computing environment, program modules can be located in both local and remote memory storage devices.

In the following detailed description, references are made to the accompanying drawings that form a part hereof, and that show, by way of illustration, specific configurations or examples. The drawings provided herewith are not drawn to scale. Like numerals represent like elements throughout the several figures (which might be referred to herein as a "FIG." or "FIGS.").

Figure 1:
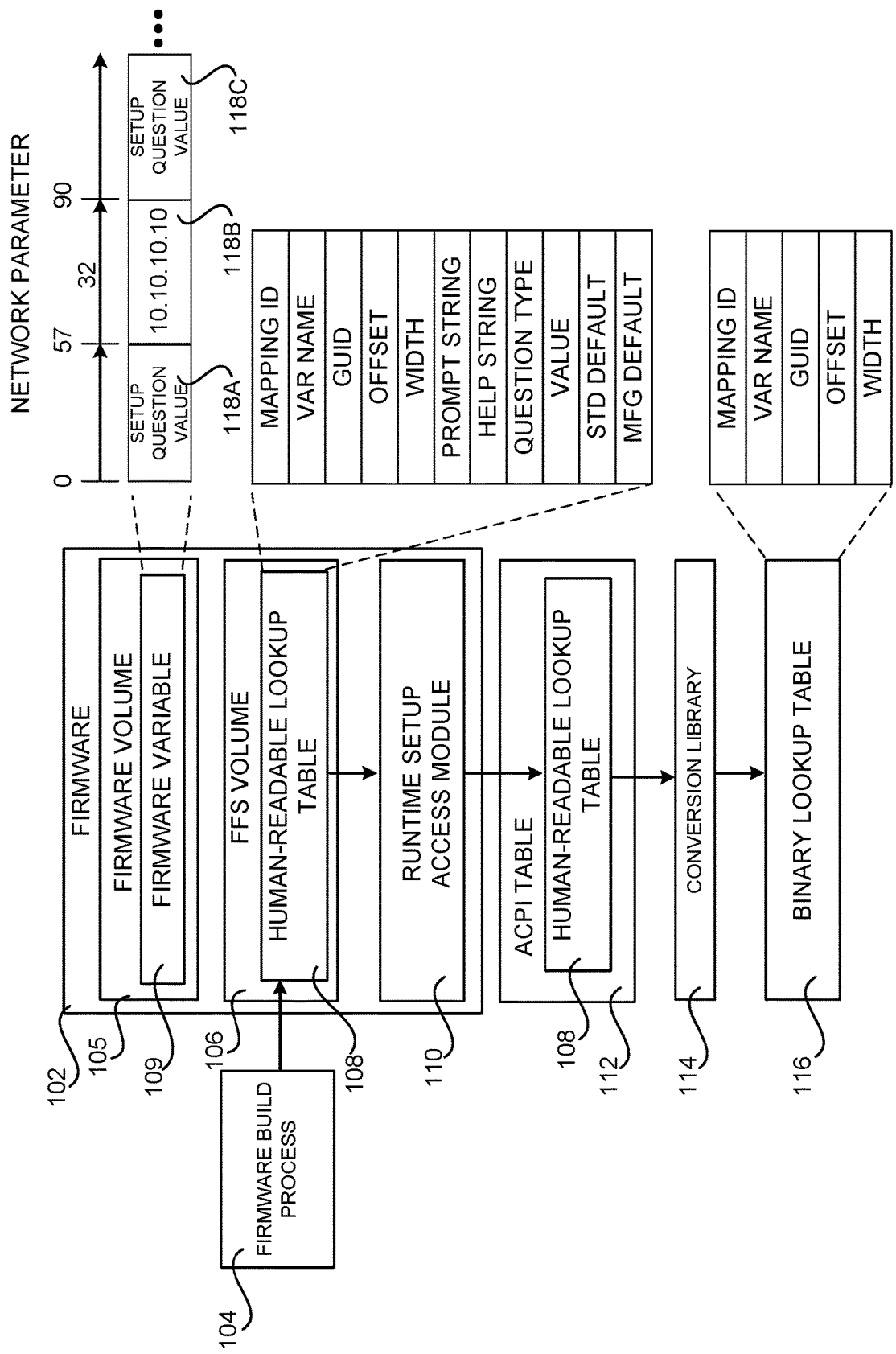
FIG. 1 is a software architecture diagram showing aspects of one mechanism disclosed herein for creating a binary lookup table during boot time of a firmware, according to one embodiment disclosed herein.

FIG. 1 is a software architecture diagram showing aspects of one mechanism disclosed herein for creating a binary lookup table during boot time of a firmware, according to one embodiment disclosed herein. As described briefly above, many types of computing systems include a firmware-provided setup utility through which users can define aspects of the configuration of the platform. Through such a utility, users can define values, which might be referred to herein as "setup question values," that are associated with questions, which might be referred to herein as "setup questions," posed by the utility. Values for setup questions that are defined through such a utility can be stored in a non-volatile memory device so that the values remain available even after a computing device has been powered off.

During boot time (i.e. the time before a firmware hands off control to an operating system), a firmware-provided setup utility can be used to view and set setup question values. During runtime, however, getting and setting values for firmware setup questions typically requires the use of platform and operating system-specific program code, such as drivers and applications. These platform-specific tools can require significant time and effort to create and, as a result, might not be available for all hardware platforms and operating systems.

In order to address the technical problem described above, and potentially others, a firmware 102 is disclosed herein that enables setting and getting setup question values during runtime in a platform-independent manner. As a result, custom platform-specific drivers and applications are not required to get and set setup question values during the runtime of a computing system executing the firmware 102. Technical benefits other than those specifically mentioned herein can also be realized through implementations of the disclosed technologies.

As shown in FIG. 1, the firmware 102 includes a firmware volume 105 in one embodiment that includes firmware variables 109. Firmware variables 109 are data structures that include setup question values 118. In the example shown in FIG. 1, for instance a firmware variable 109 is illustrated that includes setup question values 118A, 118B, and 118C. Although a single firmware variable 109 is illustrated, it is to be appreciated that many more firmware variables 109 containing many more setup question values 118 can be stored in the firmware volume 105. The firmware 102, including the firmware volume 105, is stored in a non-volatile memory device, such as a non-volatile random access memory ("NVRAM").

As shown in FIG. 1, the firmware 102 also includes an FFS volume 106 in one embodiment that includes a human-readable lookup table 108. The human-readable lookup table 108 is generated by a firmware build process 104 during build time of the firmware 102 and stored in the FFS volume 106. The human-readable lookup table 108 might be stored in another location in other embodiments.

As discussed briefly above, the human-readable lookup table 108 describes aspects of setup questions utilized by the firmware 102. For example, and without limitation, the human-readable lookup table 108 can include data defining the name, GUID, prompt and help strings, question type, possible values, and a default value for each setup question.

As also discussed briefly above, the human-readable lookup table 108 also includes data for each setup question value 118 describing the location of the value 118 within a firmware variable 109. For instance, the human-readable lookup table 108 might include data defining an offset into a firmware variable 108 for a value and the width (i.e. size) of the value. In the example shown in FIG. 1, for instance, the offset in the human-readable lookup table 108 for the value 118B is 57 and the width of the value 118B is 32.

The human-readable lookup table 108 also defines a mapping ID for each setup question value. The mapping ID is data that defines a unique keyword for each value. As will be described in greater detail below, the mapping ID can be utilized to easily get and set setup question values at runtime of a computing device executing the firmware 102.

In one embodiment, the human-readable lookup table 108 is expressed using JAVASCRIPT object notation ("JSON"). However, other human-readable formats can be utilized in other embodiments such as, for example, extensible markup language ("XML"). One example of the human-readable lookup table 108, expressed in JSON in this example, is set forth below in Table 1.

TABLE 1

{ "MappingID": "REDF002",
"Prompt": "IP address",
"Help": "Enter IP address",
"QuestionType": "String",
"MinLength": 7,
"MaxLength": 15,
"VarID" : 1,
"VarOffset": 57,
"VarWidth" : 32,
"Value" : "10.10.10.10",
"StdDefault" : "0.0.0.0",
"MfgDefault" : "0.0.0.0", The firmware 102 also includes a runtime setup access module 110 that provides aspects of the functionality disclosed herein for accessing setup question values during runtime. During boot time of a computing system executing the firmware 102, the runtime setup access module 110 copies the human-readable lookup table 108 to ACPI memory. As will be described in greater detail below with regard to FIG. 5, applications can access the human-readable lookup table 108 at runtime through ACPI.

The runtime setup access module 110 also utilizes a firmware-provided conversion library 114 (for converting JSON in one embodiment) to convert portions of the human-readable lookup table 108 to a binary lookup table 116. The binary lookup table 116 utilizes a compressed, non-human readable format to store some or all of the information associated with setup question values. For example, and without limitation, the binary lookup table 116 can include a portion of the data in the human-readable lookup table 108 for each setup question value, such as the mapping ID, name, and GUID.

The binary lookup table 116 also specifies the offset and width in a firmware variable 109 of each setup question value 118. The offset and width of each setup question value can be utilized to locate the setup question value within the non-volatile memory. Additional details regarding this process are provided below.

Figure 2:
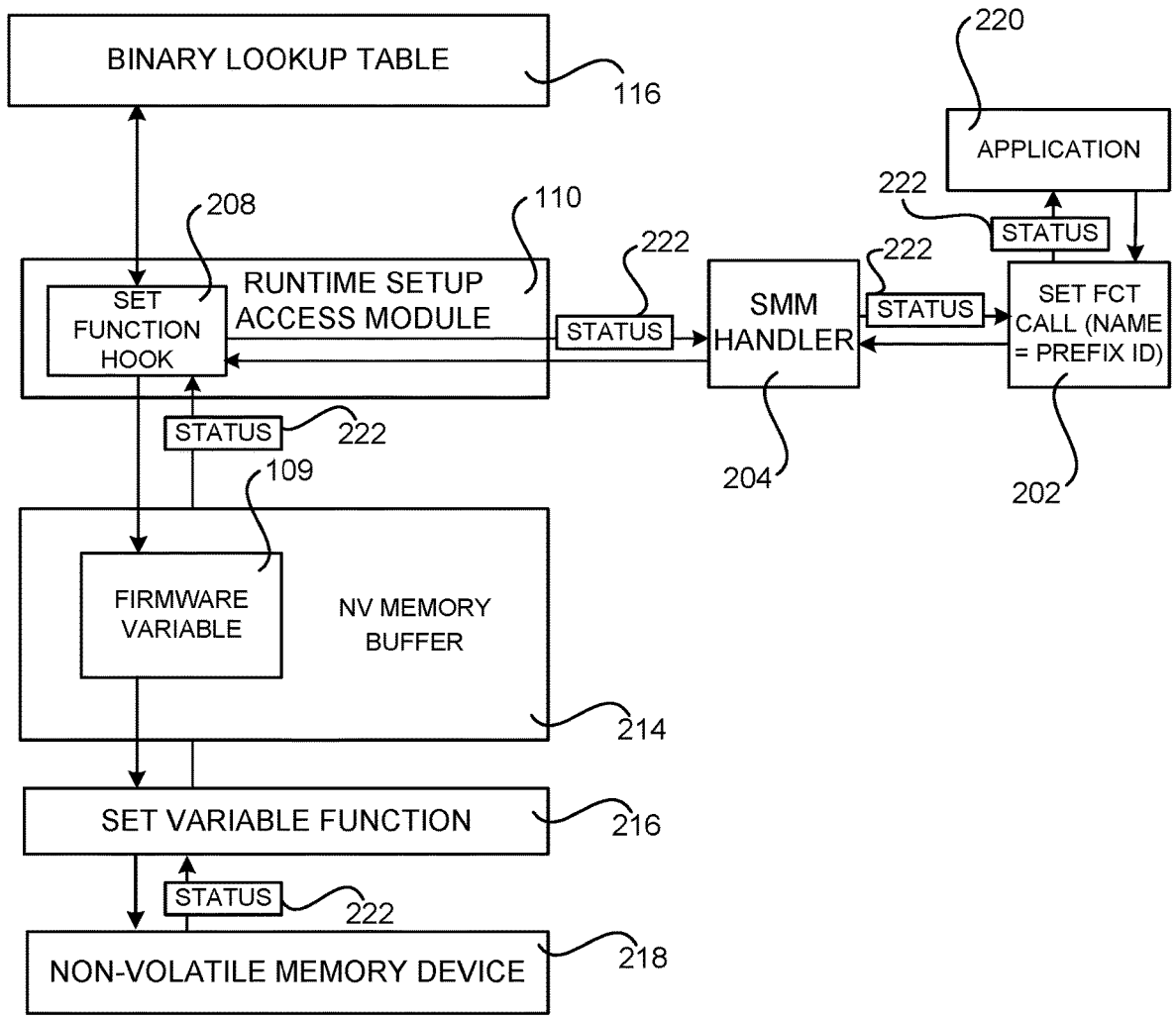
FIG. 2 is a software architecture diagram showing aspects of one mechanism disclosed herein for performing an operation for setting a setup question value, according to one embodiment disclosed herein.

FIG. 2 is a software architecture diagram showing aspects of one mechanism disclosed herein for performing an operation for setting a setup question value during runtime, according to one embodiment disclosed herein. As shown in FIG. 2, an application 220 executing on a computing device configured with the disclosed firmware 102 can generate a function call 202 (which might also be referred to herein as the "request 202") to execute a runtime function for setting a firmware variable 109.

In one embodiment, the function call 202 is made to a SMM handler 204 executing in the firmware 102. On computing systems executing the WINDOWS operating system, the request 202 might also be generated using a WMI script, for instance. Additional details regarding these aspects are provided below with respect to FIG. 5.

The request 202 can utilize a pre-defined custom format to signal to the firmware 102 that the get or set request 202 is to be satisfied utilizing a mapping ID. In one embodiment, for example, the request 202 is formatted such that the name of the firmware variable 109 includes a pre-defined prefix and the mapping ID of the setup question value 118. In one particular example, for instance, the setup question value name in the request 202 might be formatted as "$AMID-<mappingID>." The remainder of the request 202 can be formatted using a standard format utilized for function calls to conventional firmware-provided functions for getting and setting firmware variables 109. Other formats can be used in other configurations.

In order to receive and respond to requests 202 to get and set setup question values 210 formatted in the manner described above, the disclosed firmware 102 includes function hooks ("hooks") that intercept and process function calls 202 directed to conventional firmware-provided functions for getting and setting firmware variables 109. For instance, in the example shown in FIG. 2, the runtime setup access module 110 provides a hook 208 for intercepting requests 202 to a conventional function 216 for setting firmware variables 109.

Figure 4:
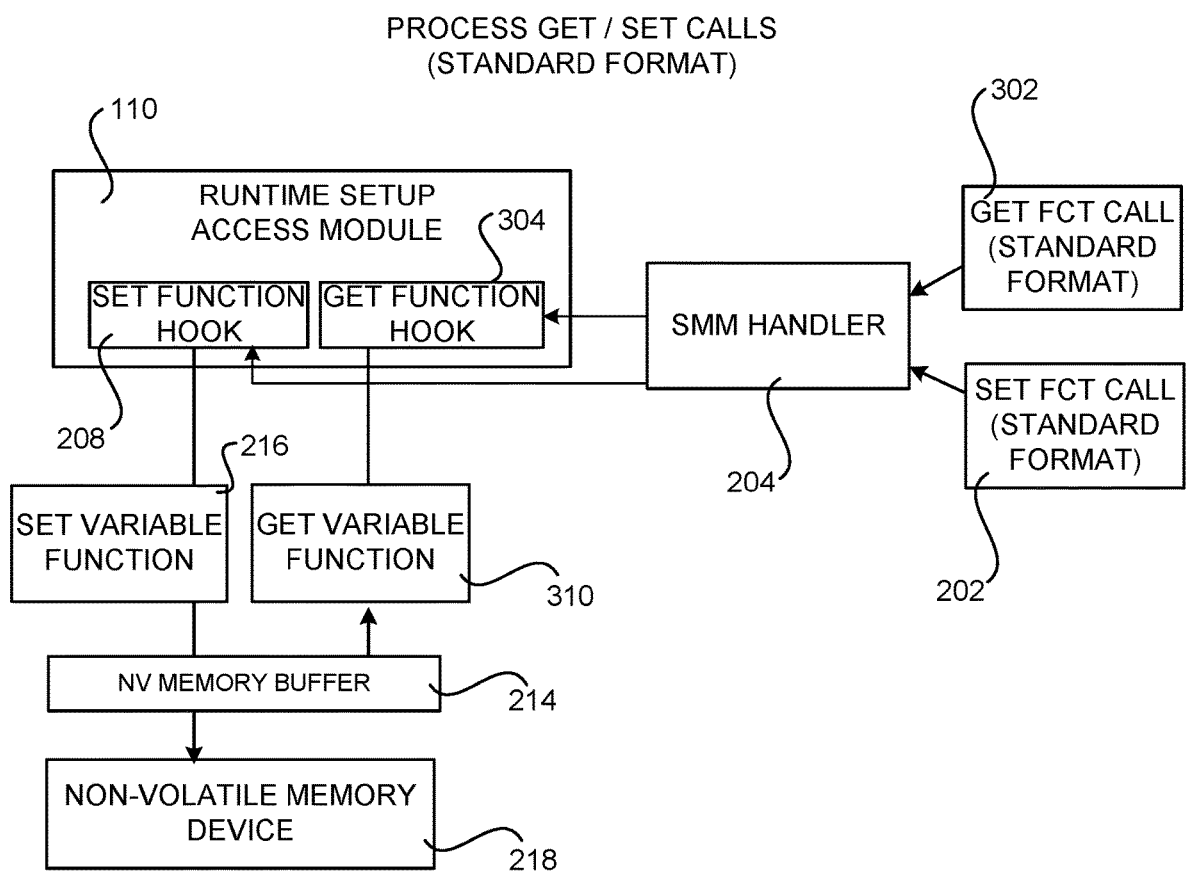
FIG. 4 is a software architecture diagram showing aspects of one mechanism disclosed herein for performing operations for getting or setting a setup question value using conventional get and set firmware variable functions provided by a firmware, according to one embodiment disclosed herein.

When the hook 208 receives a request 202 to perform a firmware-provided runtime function for setting a firmware variable 109, the hook 208 determines whether the request 202 is in the custom format described above or in the standard format used for making function calls to set firmware variables 109. If the hook 208 determines that the request 202 to set a setup question value 118 is in the standard format, the hook 208 calls the conventional set variable function 216 to perform the requested operation. This is illustrated in FIG. 4.

If, however, the hook 208 determines that the request 202 to set a firmware variable 109 is in the custom format, the hook 208 locates the mapping ID associated with the setup question value 118 to be set. As discussed above, the request 202 includes the mapping ID when the custom format is utilized.

Once the mapping ID for the value 118 to be set has been located, the hook 208 performs a lookup operation in the binary lookup table 116 for the mapping ID. If an entry in the binary lookup table 116 is located that includes the mapping ID, the hook 208 retrieves the name, GUID, offset, and bit width associated with the setup question value 118 to be set.

The hook 208 then performs the requested set operation by retrieving the current value of the firmware variable 109 to be modified, updating the firmware variable 109 with the new value 118 at the specified offset, and storing the updated firmware variable 109 in the buffer 214. The hook 208 then calls the conventional set variable function 216 which, in turn, stores the modified firmware variable 109 in the non-volatile memory device 218.

Upon completion, the conventional set variable function 216 returns a status 222 (e.g. completion or error) to the hook 208. The hook 208, in turn, returns the status 222 to the calling function and, subsequently, to the application 220 that generated the request 202.

Figure 3:
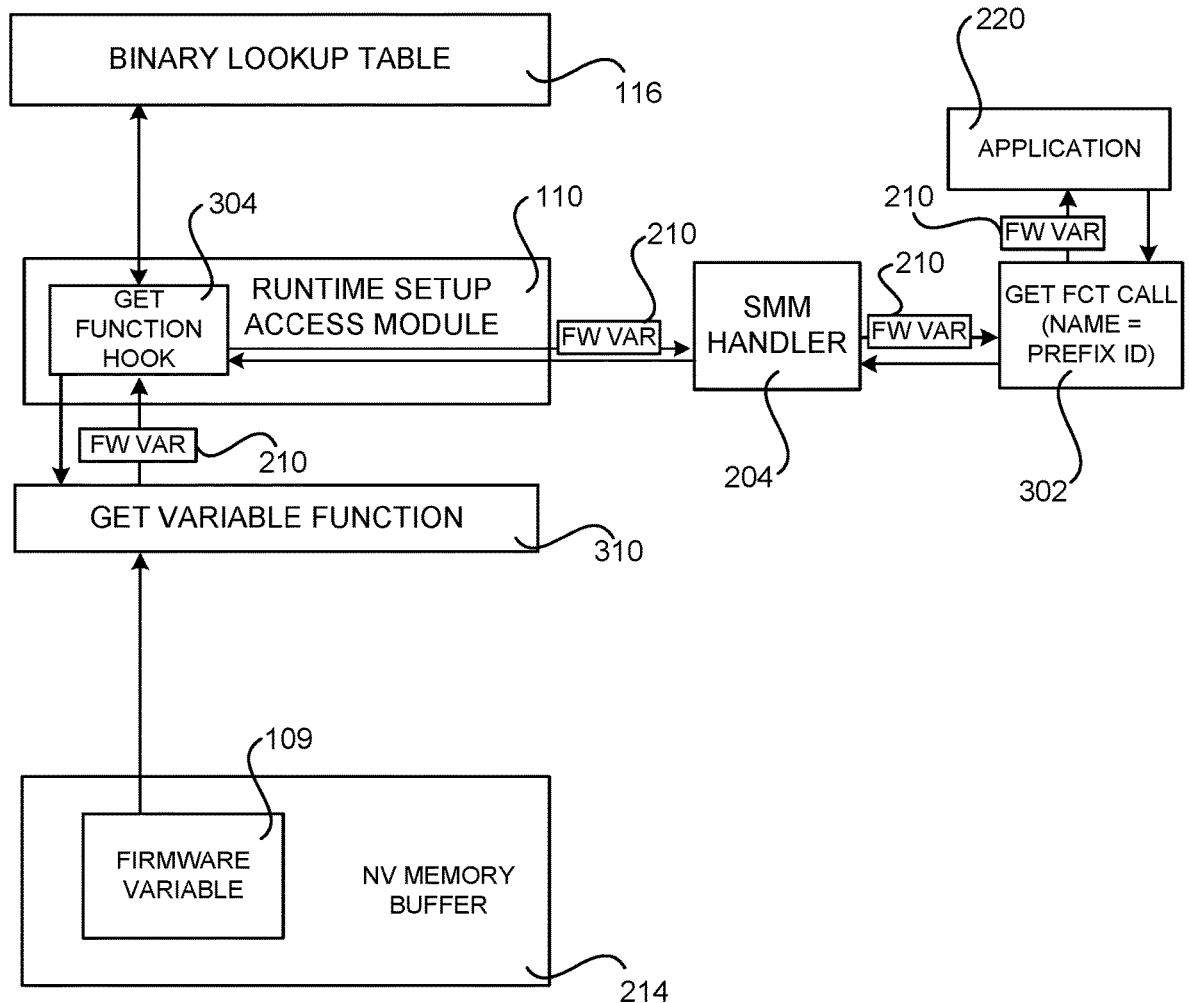
FIG. 3 is a software architecture diagram showing aspects of one mechanism disclosed herein for performing an operation for getting a setup question value, according to one embodiment disclosed herein.

FIG. 3 is a software architecture diagram showing aspects of one mechanism disclosed herein for performing an operation for setting a setup question value 118, according to one embodiment disclosed herein. As shown in FIG. 3, an application 220 executing on a computing device configured with the disclosed firmware 102 can generate a function call 302 (which might also be referred to herein as the "request 302") to execute a runtime function for setting a firmware variable 109.

In one embodiment, the function call 302 is made to a SMM handler 204 executing in the firmware 102. On computing systems executing the WINDOWS operating system, the request 302 might also be generated using a WMI script, for instance. Additional details regarding these aspects are provided below with respect to FIG. 5.

As in the case with a request to set a firmware variable, the get request 302 utilizes a pre-defined custom format to signal to the firmware 102 that the request 302 is to be satisfied utilizing a mapping ID. In one embodiment, for example, the request 302 is formatted such that it includes a pre-defined prefix and the mapping ID of the setup question value 118 to be retrieved. In one particular example, for instance, the setup question value name in the request 302 might be formatted as "$AMID-<mappingID>." The remainder of the request 302 can be formatted using a standard format utilized for function calls to conventional firmware-provided functions for getting firmware variables 109. Other formats can be used in other configurations.

In order to receive and respond to requests 302 to get firmware variables 109 formatted in the manner described above, the disclosed firmware 102 includes a hook that intercepts and process function calls 302 directed to conventional firmware-provided functions for getting firmware variables. For instance, in the example shown in FIG. 2, the runtime setup access module 110 provides a hook 304 for intercepting requests 302 to a conventional function 310 for getting firmware variables 109.

When the hook 304 receives a request 302 to perform a firmware-provided runtime function for getting a firmware variable, the hook 304 determines whether the request 302 is in the custom format described above or in the standard format used for making function calls to get firmware variables. If the hook 304 determines that the request 302 to get a setup question value 118 is in the standard format, the hook 304 calls the conventional get variable function 310 to perform the requested get operation. This is illustrated in FIG. 4.

If, however, the hook 304 determines that the request 302 to get a firmware variable is in the custom format, the hook 304 locates the mapping ID associated with the setup question value 118 to be retrieved. As discussed above, the request 302 includes the mapping ID when the custom format is utilized.

Once the mapping ID for the value 118 to be retrieved has been located, the hook 304 performs a lookup operation in the binary lookup table 116 for the mapping ID. If an entry in the binary lookup table 116 is located that includes the mapping ID, the hook 304 retrieves the name, GUID, offset, and bit width associated with the setup question value 118 to be obtained. The hook 304 then performs the requested get operation by calling the conventional get variable function 310 with the name, GUID, offset, and bit width to obtain the setup question value 118 from the variable buffer 212.

Upon completion, the get variable function 310 returns the requested setup question value 118 to the hook 304. The hook 304, in turn, returns the setup question value 118 to the calling function and, subsequently, to the application 220 that generated the get request 302.

In one embodiment, the firmware 102 is a firmware that is compliant with the Unified Extensible Firmware Interface ("UEFI") Specification. In this embodiment, the conventional set variable function 216 is the UEFI SetVariable( ) function and the conventional get variable function 302 is the UEFI GetVariable( ) function. These functions are runtime functions provided by a UEFI-Specification compliant firmware 102 that provide functionality for setting and getting setup question values, respectively, at runtime. Other functions for getting and setting firmware variables can be utilized with other types of firmware configured according to other specifications.

Figure 5:
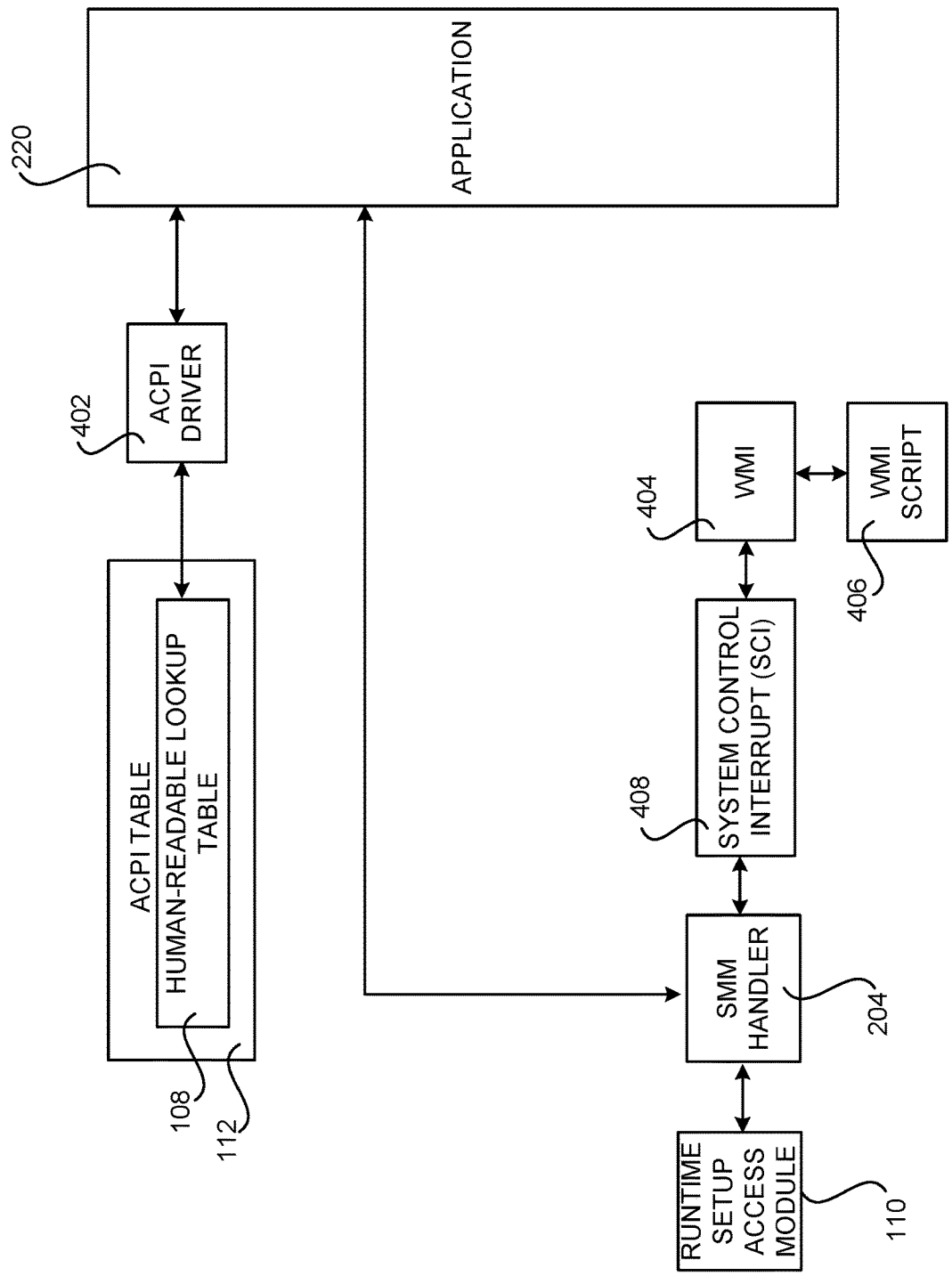
FIG. 5 is a software architecture diagram showing aspects of one mechanism disclosed herein for enabling an application to get or set setup question values utilizing the disclosed technologies, according to one embodiment disclosed herein.

FIG. 5 is a software architecture diagram showing aspects of one mechanism disclosed herein for enabling an application to get or set setup question values 118 utilizing the disclosed technologies, according to one embodiment disclosed herein. As shown in FIG. 5 and described briefly above, the runtime setup access module 112 also makes the human-readable lookup table 108 available to applications 220 at runtime through ACPI. Applications 220 can access the contents of the human-readable lookup table 108 at runtime through an OS-provided ACPI driver 402 in some configurations. In this way, it is only necessary for developers to create applications 220 that execute in the user space in order to get and set setup question values. Developers do not need to create code that executes in the kernel space as required by previous solutions.

As also shown in FIG. 5, in implementations where the application 220 executes on the WINDOWS operating system, WMI 404 can be utilized to make calls to set or get setup question values in the manner described above. For example, a WMI script 406 can be created that generates a system control interrupt 408 for calling the SMM handler 204 described above. As described in detail above, the SMM handler 204, in turn, calls the runtime setup access module 110 to get or set setup question values 118 in the manner described above. When the application 220 executes on the WINDOWS operating system and utilizes WMI 404 in the manner described above, only OS-provided components are needed to get and set setup question values.

Figure 6:
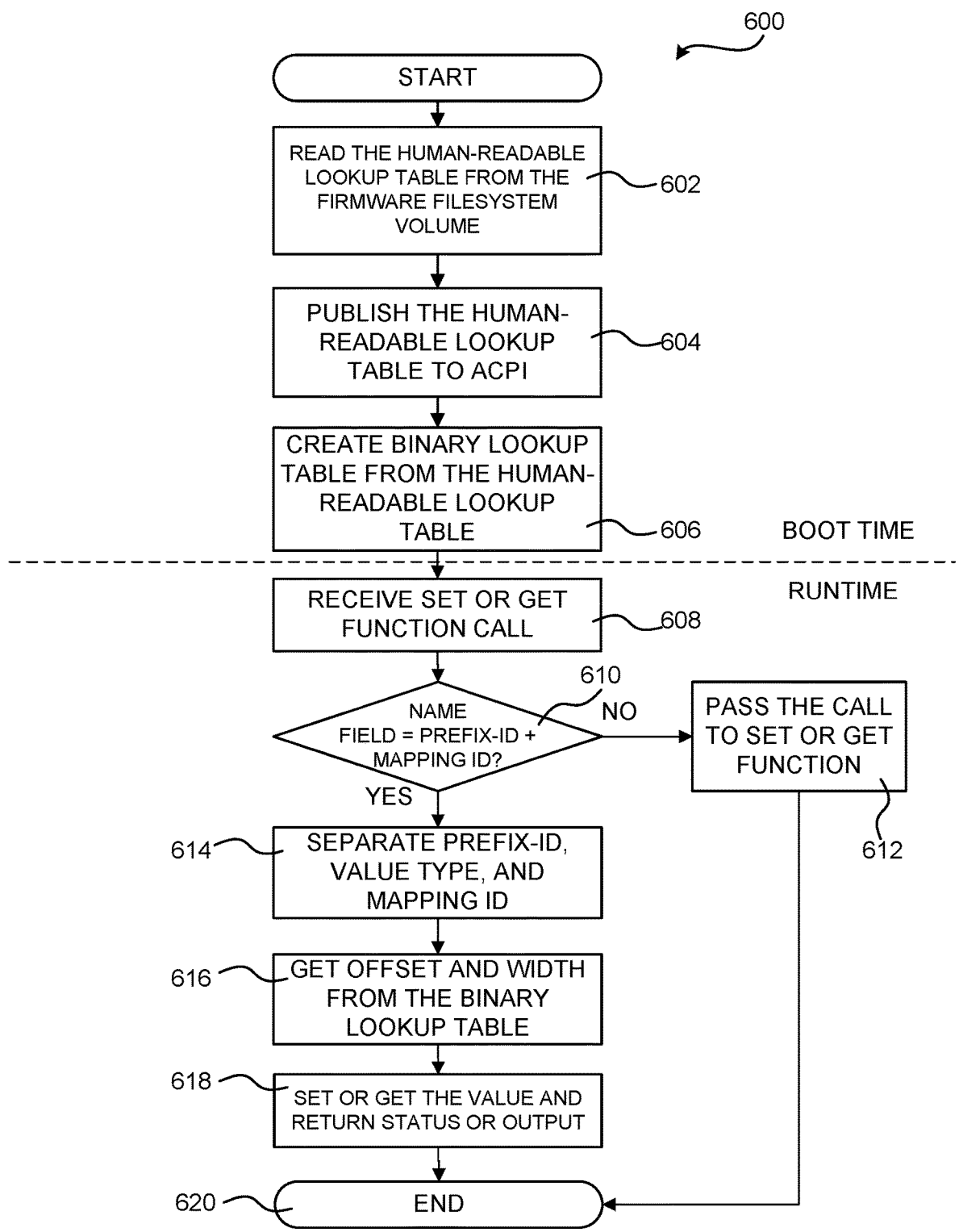
FIG. 6 is a flow diagram showing a routing that illustrates aspects of the mechanism disclosed herein for runtime access to firmware platform configuration data.

FIG. 6 is a flow diagram showing a routine 600 that illustrates aspects of the mechanism disclosed herein for providing runtime access to setup question values 118. It is to be appreciated that the logical operations described herein with respect to FIG. 6 and the other FIGS., can be implemented (1) as a sequence of computer implemented acts or program modules running on a computing device and/or (2) as interconnected machine logic circuits or circuit modules within the computing device.

The implementation of the various components described herein is a matter of choice dependent on the performance and other requirements of the computing device. Accordingly, the logical operations described herein are referred to variously as operations, structural devices, acts, or modules. These operations, structural devices, acts, and modules can be implemented in software, in firmware, in special purpose digital logic, and any combination thereof. It should also be appreciated that more or fewer operations might be performed than shown in the FIGS. and described herein. These operations can also be performed in parallel, or in a different order than those described herein. These operations can also be performed by components other than those specifically identified.

The routine 600 begins at operation 602, where the runtime setup access module 110 reads the human-readable lookup table 108 from the FFS volume 106. The routine 600 then proceeds from operation 602 to operation 604, where the runtime setup access module 110 publishes the human-readable lookup table 108 to an ACPI table 112. From operation 604, the routine 600 proceeds to operation 606, where the runtime setup access module 110 utilizes the conversion library 114 to create the binary lookup table 116.

From operation 606, the routine 600 proceeds to operation 608, where the runtime setup access module 110 receives a get function call 302 or a set function call 202. The routine 600 then proceeds from operation 608 to operation 610, where the runtime setup access module 110 determines if the received function call is formatted in the custom format or in the standard format. As discussed above, the custom format utilizes a prefix-id followed by the mapping ID for the setup question value 118 to be get or set in one embodiment. Other formats that specify the mapping ID for the value to be get or set and that can be distinguished from the standard format can be utilized in other embodiments.

If the received call is in the standard format, the routine 600 proceeds from operation 610 to operation 612. At operation 612, the function call is passed to the convention get or set function, as appropriate, in the manner described above with reference to FIG. 4. The routine 600 then proceeds from operation 612 to operation 620, where it ends.

If the received call is in the custom format, the routine 600 proceeds from operation 610 to operation 614, where the runtime setup access module 110 extracts the prefix-id, the value type, and the mapping ID from the function call. The routine 600 then proceeds to operation 616, where the runtime setup access module 110 obtains the offset and width of the setup question value to be get or set from the binary lookup table 116.

Once the runtime setup access module 110 has obtained the offset and width, the routine 600 proceeds from operation 616 to operation 618, where the runtime setup access module 110 gets or sets the specified setup question value 118, as appropriate, in the manner described above with regard to FIGS. 2 and 3. As described above, once the runtime setup access module 110 has retrieved the offset and width for the setup question value to be get or set, the runtime setup access module 110 can utilize the conventional get or set functions to perform the requested operation. From operation 618, the routine 600 proceeds to operation 620, where it ends.

Figure 7:
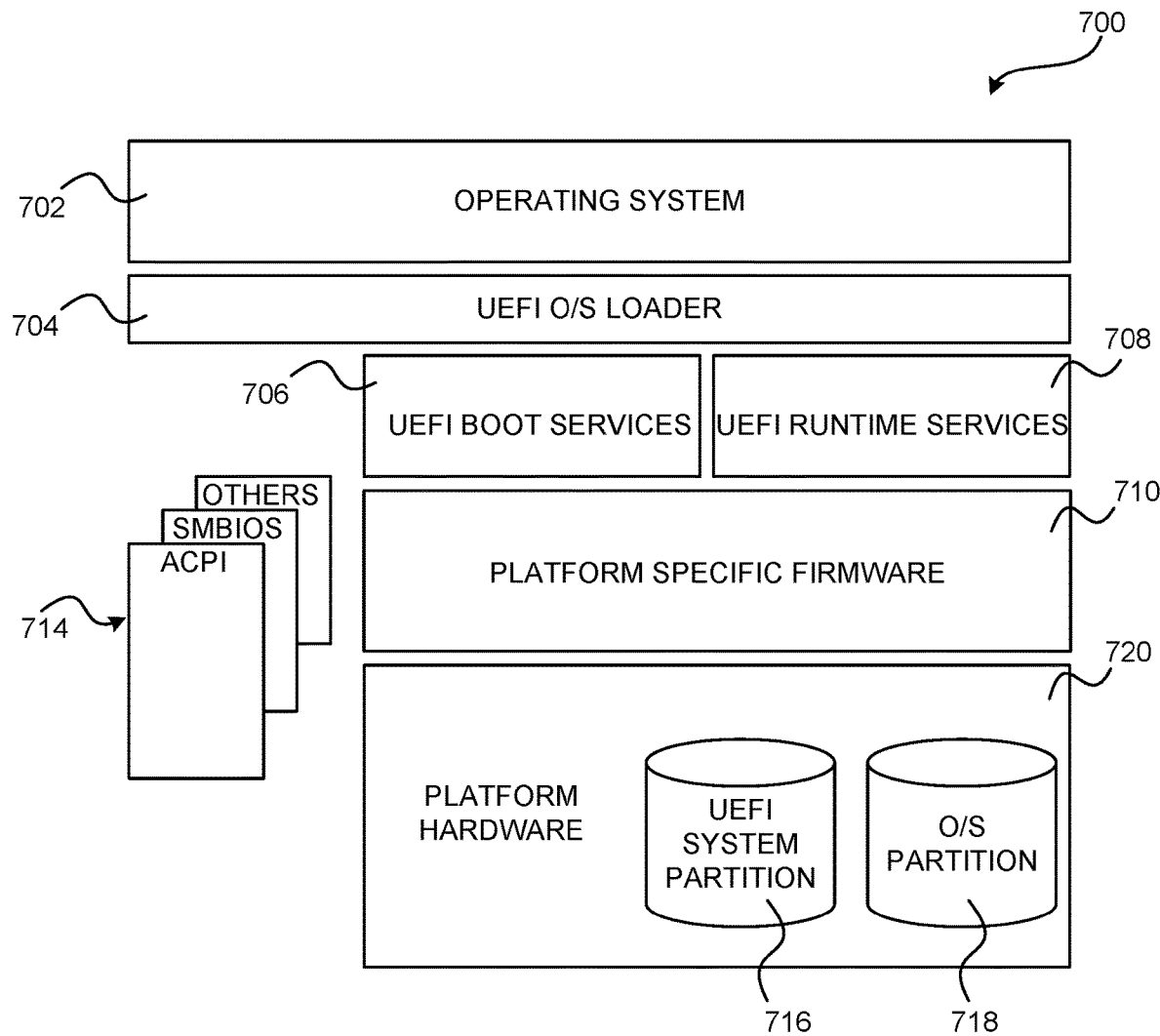
FIG. 7 is a software architecture diagram illustrating a software architecture for a UEFI-compliant firmware that provides an operating environment for aspects of the technologies presented herein in one embodiment.

Turning now to FIG. 7, a software architecture diagram will be described that illustrates an architecture 700 for a UEFI Specification-compliant firmware that can be configured to provide and/or utilize aspects of the technologies disclosed herein. In particular, the firmware architecture 700 shown in FIG. 7 can be utilized to implement the firmware 102 described above. The firmware 102 can also be implemented in conjunction with other firmware architectures in other configurations.

The UEFI Specification describes an interface between an operating system 702 and a UEFI Specification-compliant firmware 102. The UEFI Specification also defines an interface that a firmware 102 can implement, and an interface that an operating system ("OS") 112 can use while booting. How a firmware implements the interface can be left up to the manufacturer of the firmware. The UEFI Specification also defines a way for an operating system 702 and a firmware 102 to exchange information necessary to support the operating system boot process. The term "UEFI Specification" used herein refers to the EFI Specification developed by INTEL CORPORATION, the UEFI Specification managed by the UEFI FORUM, and other related specifications available from the UEFI FORUM.

As shown in FIG. 7, the architecture can include platform hardware 720, such as that described below with regard to FIG. 7, an operating system 702, and a UEFI system partition 716. The UEFI system partition 716 can be an architecturally shareable system partition. As such, the UEFI system partition 716 can define a partition and file system designed to support safe sharing of mass storage between multiple vendors. An OS partition 718 can also be utilized.

Once started, the UEFI OS loader 704 can continue to boot the complete operating system 702. In doing so, the UEFI OS loader 704 can use UEFI boot services 706, UEFI runtime services 708, and an interface to other supported specifications, to survey, comprehend, and initialize the various platform components and the operating system software that manages them. Thus, interfaces 714 from other specifications can also be present on the system. For example, ACPI and the System Management BIOS ("SMBIOS") specifications can be supported.

UEFI boot services 706 can provide interfaces for devices and system functionality used during boot time. UEFI runtime services 708 can also be available to the UEFI OS loader 704 during the boot phase and can provide interfaces, such as the variable storage and retrieval services described above. UEFI allows extension of platform firmware by loading UEFI driver and UEFI application images which, when loaded, have access to UEFI-defined runtime and boot services such as those described above.

Additional details regarding the operation and architecture of a UEFI Specification-compliant firmware can be found in the UEFI Specification, which is available from the UEFI Forum. The UEFI Forum has also provided further details regarding recommended implementation of UEFI in the form of the Platform Initialization ("PI") Specification. Unlike the UEFI Specification, which focuses on programmatic interfaces for the interactions between the operating system 702 and system firmware 102, the PI specification describes a firmware implementation that has been designed to perform the full range of operations that are required to initialize a platform from power on through transfer of control to the operating system 702. The PI specification, which is available from UEFI Forum, is also expressly incorporated herein by reference.

Figure 8:
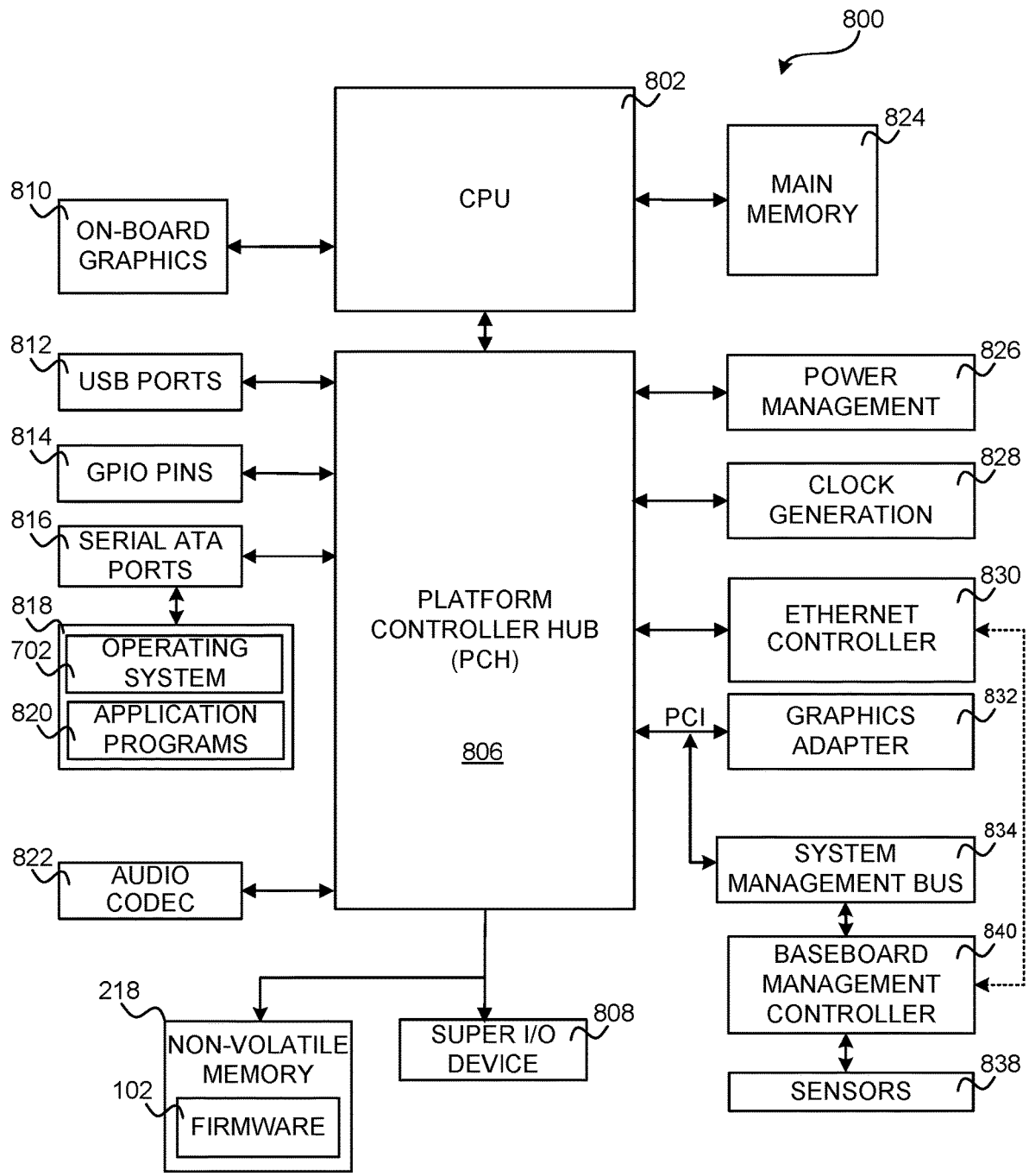
FIG. 8 is a computer architecture diagram that shows an illustrative architecture for a computer that can implement the technologies disclosed herein.

Referring now to FIG. 8, a computer architecture diagram that shows an illustrative architecture for a computer that can provide an operating environment for the technologies presented herein will be described. For example, and without limitation, the computer architecture shown in FIG. 8 can be utilized to implement a computing device 102 that executes the firmware 102.

FIG. 8 and the following discussion are intended to provide a brief, general description of a suitable computing environment in which the configurations described herein can be implemented. While the technical details are presented herein in the general context of program modules that execute in conjunction with the execution of an operating system, those skilled in the art will recognize that the configurations can also be implemented in combination with other program modules.

Generally, program modules include routines, programs, components, data structures, and other types of structures that perform particular tasks or implement particular abstract data types. Moreover, those skilled in the art will appreciate that the configurations described herein can be practiced with other computer system configurations, including handheld devices, multiprocessor systems, microprocessor-based or programmable consumer electronics, minicomputers, mainframe computers, and the like. The configurations described herein can also be practiced in distributed computing environments where tasks are performed by remote processing devices that are linked through a communications network. In a distributed computing environment, program modules can be located in both local and remote memory storage devices.

In particular, FIG. 8 shows an illustrative computer architecture for a computer 800 that can implement the technologies described herein. The illustrative computer architecture shown in FIG. 8 includes a baseboard, or "motherboard", which is a printed circuit board to which a multitude of components or devices can be connected by way of a system bus or other electrical communication path. In one illustrative configuration, a central processing unit ("CPU") 802 operates in conjunction with a Platform Controller Hub ("PCH") 806. The CPU 802 is a central processor that performs arithmetic and logical operations necessary for the operation of the computer 800. The computer 800 can include a multitude of CPUs 802. Each CPU 802 might include multiple processing cores.

The CPU 802 provides an interface to a RAM used as the main memory 824 in the computer 800 and, possibly, to an on-board graphics adapter 810. The PCH 806 provides an interface between the CPU 802 and the remainder of the computer 800.

The PCH 806 can also be responsible for controlling many of the input/output functions of the computer 800. In particular, the PCH 806 can provide one or more universal serial bus ("USB") ports 812, an audio codec 822, an Ethernet Controller 830, and one or more general purpose input/output ("GPIO") pins 814. The USB ports 812 can include USB 2.0 ports, USB 3.0 ports and USB 3.1 ports among other USB ports.

The PCH 806 can also include functionality for providing networking functionality through an Ethernet Controller 830. The Ethernet Controller 830 is capable of connecting the computer 800 to another computer via a network. Connections that can be made by the Ethernet Controller 830 can include LAN or WAN connections. LAN and WAN networking environments are commonplace in offices, enterprise-wide computer networks, intranets, and the Internet.

The PCH 806 can also provide a bus for interfacing peripheral card devices such as a graphics adapter 832. In one configuration, the bus comprises a PCI bus. The PCI bus can include a Peripheral Component Interconnect ("PCI") bus, a Peripheral Component Interconnect eXtended ("PCI-X") bus and a Peripheral Component Interconnect Express ("PCIe") bus among others.

The PCH 806 can also provide a system management bus 834 for use in managing the various components of the computer 800. Additional details regarding the operation of the system management bus 834 and its connected components are provided below. Power management circuitry 826 and clock generation circuitry 828 can also be utilized during the operation of the PCH 806.

The PCH 806 is also configured to provide one or more interfaces for connecting mass storage devices to the computer 800. For instance, according to one configuration, the PCH 806 includes a serial advanced technology attachment ("SATA") adapter for providing one or more serial ATA ports 816. The serial ATA ports 816 can be connected to one or more mass storage devices storing an operating system and applications 220, such as a SATA disk drive 818. As known to those skilled in the art, an OS comprises a set of programs that control operations of a computer and allocation of resources. An application 220 is software that runs on top of the operating system, or other runtime environment, and uses computer resources to perform application specific tasks desired by the user, such as those described herein.

According to one configuration, the OS comprises the LINUX operating system. According to another configuration, the OS comprises the WINDOWS operating system from MICROSOFT CORPORATION. According to another configuration, the OS comprises the UNIX operating system or one of its variants. It should be appreciated that other operating systems can also be utilized.

The mass storage devices connected to the PCH 806, and their associated computer-readable storage media, provide non-volatile storage for the computer 800. Although the description of computer-readable storage media contained herein refers to a mass storage device, such as a hard disk or CD-ROM drive, it should be appreciated by those skilled in the art that computer-readable storage media can be any available media that can be accessed by the computer 800.

By way of example, and not limitation, computer-readable storage media can comprise computer storage media and communication media. Computer storage media includes volatile and non-volatile, removable and non-removable media implemented in any method or technology for storage of information such as computer-readable instructions, data structures, program modules or other data. However, computer-readable storage media does not encompass transitory signals. Computer storage media includes, but is not limited to, RAM, ROM, EPROM, EEPROM, flash memory or other solid state memory technology, CD-ROM, DVD, HD-DVD, BLU-RAY, or other optical storage, magnetic cassettes, magnetic tape, magnetic disk storage or other magnetic storage devices, or any other medium which can be used to store the desired information, and which can be accessed by the computer 800.

A low pin count ("LPC") interface can also be provided by the PCH 806 for connecting a Super I/O device 808. The Super I/O device 808 is responsible for providing a number of input/output ports, including a keyboard port, a mouse port, a serial interface, a parallel port, and other types of input/output ports. The LPC interface can also connect a computer storage media such as a ROM or a flash memory such as a non-volatile memory 218 for storing firmware 102 that includes program code containing the basic routines that help to start up the computer 800 and to transfer information between elements within the computer 800 as discussed above.

It should be appreciated that the program modules disclosed herein, including the firmware 102, can include software instructions that, when loaded into the CPU 802 and executed, transform a general-purpose computer 800 into a special-purpose computer 800 customized to facilitate all, or part of, the operations disclosed herein. As detailed throughout this description, the program modules can provide various tools or techniques by which the computer 800 can participate within the overall systems or operating environments using the components, logic flows, and/or data structures discussed herein.

The CPU 802 can be constructed from any number of transistors or other circuit elements, which can individually or collectively assume any number of states. More specifically, the CPU 802 can operate as a state machine or finite-state machine. Such a machine can be transformed to a second machine, or a specific machine, by loading executable instructions contained within the program modules. These computer-executable instructions can transform the CPU 802 by specifying how the CPU 802 transitions between states, thereby transforming the transistors or other circuit elements constituting the CPU 802 from a first machine to a second machine, wherein the second machine can be specifically configured to perform the operations disclosed herein. The states of either machine can also be transformed by receiving input from one or more user input devices, network interfaces (such as the Gigabit Ethernet Controller 830), other peripherals, other interfaces, or one or more users or other actors. Either machine can also transform states, or various physical characteristics of various output devices such as printers, speakers, video displays, or otherwise.

Encoding the program modules can also transform the physical structure of the storage media. The specific transformation of physical structure can depend on various factors, in different implementations of this description. Examples of such factors can include but are not limited to the technology used to implement the storage media, whether the storage media are characterized as primary or secondary storage, and the like. For example, if the storage media are implemented as semiconductor-based memory, the program modules can transform the physical state of the semiconductor main memory 824 and/or non-volatile memory 218. For example, the software can transform the state of transistors, capacitors, or other discrete circuit elements constituting the semiconductor memory.

As another example, the storage media can be implemented using magnetic or optical technology such as hard drives or optical drives. In such implementations, the program modules can transform the physical state of magnetic or optical media, when the software is encoded therein. These transformations can include altering the magnetic characteristics of particular locations within given magnetic media. These transformations can also include altering the physical features or characteristics of particular locations within given optical media to change the optical characteristics of those locations. It should be appreciated that various other transformations of physical media are possible without departing from the scope and spirit of the present description.

As described above, the PCH 806 can include a system management bus 834. The system management bus 834 can include a baseboard management controller ("BMC") 840. The BMC 840 is a microcontroller that monitors operation of the computer 800. The BMC 840 monitors health-related aspects associated with the computer 800, such as, but not limited to, the temperature of one or more components of the computer 800, speed of rotational components (e.g., spindle motor, CPU fan, etc.) within the computer 800, the voltage across or applied to one or more components within the computer 800, and the available and/or used capacity of memory devices within the computer 800. To accomplish these monitoring functions, the BMC 840 is communicatively connected to one or more components by way of the system management bus 834 in some configurations.

In one configuration, these components include sensor devices 838 for measuring various operating and performance-related parameters within the computer 800. The sensor devices 838 can be either hardware or software based components configured or programmed to measure or detect one or more of the various operating and performance-related parameters.

The BMC 840 functions as the master on the system management bus 834 in most circumstances but can also function as either a master or a slave in other circumstances. Each of the various components communicatively connected to the BMC 840 by way of the system management bus 834 is addressed using a slave address. The system management bus 834 is used by the BMC 840 to request and/or receive various operating and performance-related parameters from one or more components, such as the firmware 102, which are also communicatively connected to the system management bus 834.

It should be appreciated that the functionality provided by the computer 800 can be provided by other types of computing devices, including hand-held computers, smartphones, gaming systems, set top boxes, tablet computers, embedded computer systems, personal digital assistants, and other types of computing devices known to those skilled in the art. It is also contemplated that the computer 800 might not include all the components shown in FIG. 8, can include other components that are not explicitly shown in FIG. 8, or might utilize an architecture completely different than that shown in FIG. 8.

Based on the foregoing, it should be appreciated that technologies for runtime access to firmware platform configuration data have been disclosed herein. Although the subject matter presented herein has been described in language specific to computer structural features, methodological acts, and computer readable media, it is to be understood that the present invention is not necessarily limited to the specific features, acts, or media described herein. Rather, the specific features, acts and mediums are disclosed as example forms.

The subject matter described above is provided by way of illustration only and should not be construed as limiting. Various modifications and changes can be made to the subject matter described herein without following the example configurations and applications illustrated and described, and without departing from the true spirit and scope of the present invention.

What is claimed is:

1. A computing device, comprising:
one or more processors; and
at least one non-transitory computer-readable storage medium having computer-executable instructions stored thereupon which, when executed by the one or more processors, cause the computing device to:
receive a request, by way of a firmware executing on the computing device, to get or set a setup question value;
responsive to receiving the request, determine if the request is in a first format or a second format different from the first format;
responsive to determining that the request is in a first format, identify a mapping identifier (ID) associated with the setup question value, perform a lookup operation in a lookup table using the mapping ID to determine an offset and bit width associated with the setup question value, and perform a firmware runtime function to get or set the setup question value using the offset and bit width associated with the setup question value; and responsive to determining the request has a second format, perform the firmware runtime function to get or set the setup question value.

2. The computing device of claim 1, wherein the lookup table is in a binary format, wherein the lookup table is generated from a lookup table in a human-readable format, and wherein the lookup table in the human-readable format is generated at a build time of the firmware.

3. The computing device of claim 2, wherein the request is received from an application executing on an operating system on the computing device, and wherein the lookup table in the human-readable format is made available to the application by way of an advanced configuration and power interface (ACPI).

4. The computing device of claim 1, wherein the request is received from an application executing on an operating system on the computing device, and wherein the request is received at a system management mode (SMM) handler executing in the firmware.

5. The computing device of claim 1, wherein the requested is received by way of a windows management interface (WMI).

6. The computing device of claim 1, wherein the at least one non-transitory computer-readable storage medium has further computer-executable instructions stored thereupon to:

return the setup question value in response to the request if the request comprises a request to perform a firmware runtime function to get a setup question value; or return a status in response to the request if the request comprises a request to perform a firmware runtime function to set a setup question value.

7. The computing device of claim 1, wherein a function hook receives the request to perform the firmware runtime function to get or set the setup question value, and wherein the function hook is configured to call a get or set function provided by the firmware to perform the firmware runtime function to get or set the setup question value.

8. The computing device of claim 7, wherein the set function is configured to:

read a firmware variable containing the setup question value from a non-volatile memory;

modify the firmware variable at the offset with a new values for the setup question value; and store the modified firmware variable in the non-volatile memory.

9. A non-transitory computer-readable storage medium having computer-executable instructions stored thereupon which, when executed by a computing device, cause the computing device to:

receive a request, by way of a firmware executing on the computing device, to perform a firmware runtime function to get or set a setup question value;

responsive to receiving the request, determine if the request is in a first format or a second format different from the first format;

responsive to determining that the request is in a first format, identify a mapping identifier (ID) associated with the setup question value, perform a lookup operation in a lookup table using the mapping ID to determine an offset and bit width associated with the setup question value, and perform the firmware runtime function to get or set the setup question value using the offset and bit width associated with the setup question value; and responsive to determining the request has a second format, perform the firmware runtime function to get or set the setup question value.

10. The non-transitory computer-readable storage medium of claim 9, wherein the lookup table is in a binary format, wherein the lookup table is generated from a lookup table in a human-readable format, and wherein the lookup table in the human-readable format is generated at a build time of the firmware.

11. The non-transitory computer-readable storage medium of claim 10, wherein the request is received from an application executing on an operating system on the computing device, and wherein the lookup table in the human-readable format is made available to the application by way of an advanced configuration and power interface (ACPI).

12. The non-transitory computer-readable storage medium of claim 9, wherein the request is received from an application executing on an operating system on the computing device, and wherein the request is received at a system management mode (SMM) handler executing in the firmware.

13. The non-transitory computer-readable storage medium of claim 9, wherein the requested is received by way of a windows management interface (WMI).

14. The non-transitory computer-readable storage medium of claim 9, having further computer-executable instructions stored thereupon to:

return the setup question value in response to the request if the request comprises a request to perform a firmware runtime function to get the setup question value; or return a status in response to the request if the request comprises a request to perform a firmware runtime function to set the setup question value.

15. The non-transitory computer-readable storage medium of claim 9, wherein a function hook receives the request to perform the firmware runtime function to get or set the setup question value, and wherein the function hook is configured to call a get or set function provided by the firmware to perform the firmware runtime function to get or set the setup question value.

16. A computer-implemented method performed by a computing device, the method comprising:

receiving a request, by way of a firmware executing on the computing device, to perform a firmware runtime function to get or set a setup question value;

responsive to receiving the request, determining if the request is in a first format or a second format different from the first format;

responsive to determining that the request is in a first format, identifying a mapping identifier (ID) associated with the setup question value, performing a lookup operation in a lookup table using the mapping ID to determine an offset and bit width associated with the setup question value, and performing the firmware runtime function to get or set the setup question value using the offset and bit width associated with the setup question value; and responsive to determining the request has a second format, performing the firmware runtime function to get or set the setup question value.

17. The computer-implemented method of claim 16, wherein the lookup table is in a binary format, wherein the lookup table is generated from a lookup table in a human-readable format, and wherein the lookup table in the human-readable format is generated at a build time of the firmware.

18. The computer-implemented method of claim 17, wherein the request is received from an application executing on an operating system on the computing device, and wherein the lookup table in the human-readable format is made available to the application by way of an advanced configuration and power interface (ACPI).

19. The computer-implemented method of claim 16, wherein the request is received from an application executing on an operating system on the computing device, and wherein the request is received at a system management mode (SMM) handler executing in the firmware.

20. The computer-implemented method of claim 16, further comprising:
   returning the setup question value in response to the request if the request comprises a request to perform a firmware runtime function to get a setup question value; or
   returning a status in response to the request if the request comprises a request to perform a firmware runtime function to set a setup question value.

* * * * *